Figure 1:
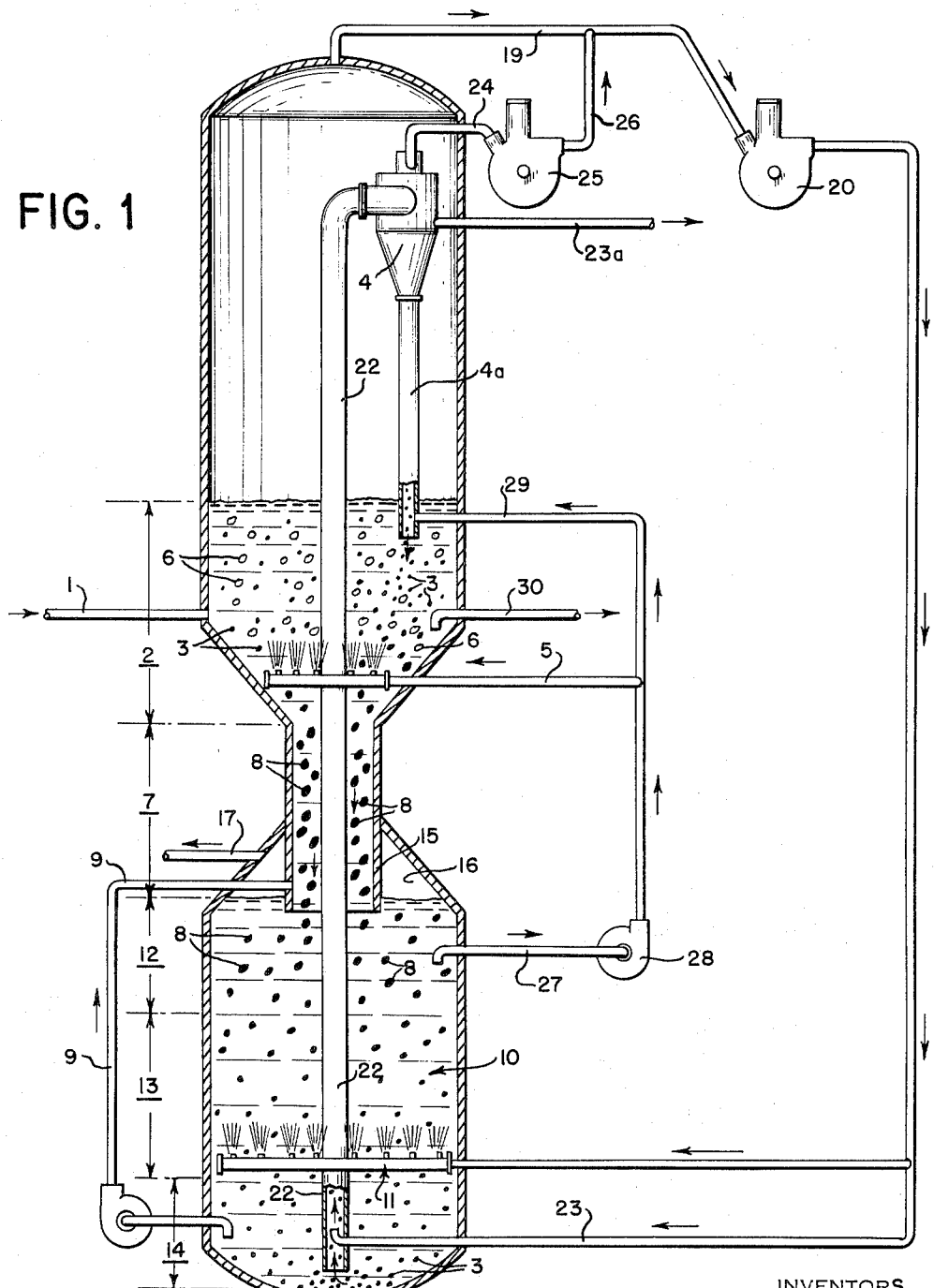

May 17, 1966  W. C. RICH, JR., ETAL  3,251,192
PROCESS FOR THE CONVERSION OF SALT WATER TO FRESH WATER
Filed Oct. 10, 1961  3 Sheets-Sheet 3

INVENTORS
WILSON C. RICH, JR.
DAVID M. BRADT
BY
ATTORNEYS

United States Patent Office 3,251,192
Patented May 17, 1966

3,251,192
PROCESS FOR THE CONVERSION OF SALT WATER TO FRESH WATER
Wilson C. Rich, Jr., 19 Highland Ave., Fair Haven, N.J., and David M. Bradt, 258 Kilburne Ave., North Tarrytown, N.Y.
Filed Oct. 10, 1961, Ser. No. 144,150
4 Claims. (Cl. 62—58)

This invention relates to the preparation by freezing of fresh water from salt water and, more particularly, to the process of preparing fresh water from salt water by, first, forming ice from the salt water on the surface of sub-cooled solid particles or liquid droplets of an immiscible liquid having a vapor pressure substantially lower than salt water through the evaporation of an immiscible refrigerant, next removing the ice-coated particles from the residual brine, washing the residual salt water from the particles and, finally, melting the ice from the particles or droplets to recover the fresh water.

Processes have been developed for the production of fresh water from salt water based on reducing the salt water temperature until ice crystals of fresh water form, then collecting and separating the ice crystals from the residual brine, after which the ice crystals are melted to form fresh water. Although fresh water can be obtained in this manner, these prior processes have been expensive because of extensive equipment requirements and because of difficulties in obtaining adequate process control. There are many reasons why these prior processes have not been economically successful and these reasons, of course, vary depending on the particular process. One difficulty, for example, is the separation of the ice crystals from the salt water and brine. Generally, the ice crystals formed are small, making it both difficult to separate them from the salt water, and difficult to wash them. In other instances, when larger ice crystals have been prepared, large equipment of low unit capacity was required.

According to this invention, salt water is introduced into a freezing zone together with a stream of small, sub-cooled water insoluble particles or liquid droplets. When heat is removed from the system, ice starts to form and its formation takes place on the coldest surface present, i.e. the small sub-cooled particles or droplets. The heat removal necessary for freezing is advantageously accomplished by allowing an immiscible refrigerant to boil or evaporate in direct contact with the salt water. The solid particles or droplets used, which have a higher density than water or brine, are larger in size than the seed crystals of pure ice that would form if such particles were not present. The ice forms on these particles or droplets and, in this manner, relatively large combined particles are produced containing the ice product. These large particles are more easily washed free of residual brine than are smaller particles. Because of their high density, they can be gravity separated from the freezing zone.

The invention further includes a continuous process for the production of fresh water from salt water. In this continuous process, the solid particles or liquid droplets used are of a density heavier than fresh or salt water. The introduction of such particles or droplets, when sub-cooled, into a freezing zone, together with salt water and an immiscible refrigerant that is permitted to boil, causes ice to deposit on the particles or droplets and the now ice-coated particles sink through and out of the freezing zone by gravity. The ice-coated particles continuously settle from the freezing zone, through a washing zone into an ice melting zone. After the ice-coating has been melted, the particles or liquid, now denuded of fresh water or ice, are sub-cooled and returned to the freezing zone for the deposition of additional ice. Concentrated salt water or brine is continuously withdrawn from the freezing zone, then heat exchanged with entering salt water feed for feed precooling.

The immiscible refrigerant used to effect the freezing of the fresh water from the salt water evaporates during the freezing step of the process and is withdrawn as a vapor from the top of the freezing zone. These refrigerant vapors are compressed, then condensed by direct heat exchange with the washed but ice-coated particles. The heat of condensation serves to melt the ice from the particles or droplets. The condensed refrigerant is recycled to the freezing zone.

Figure 2:
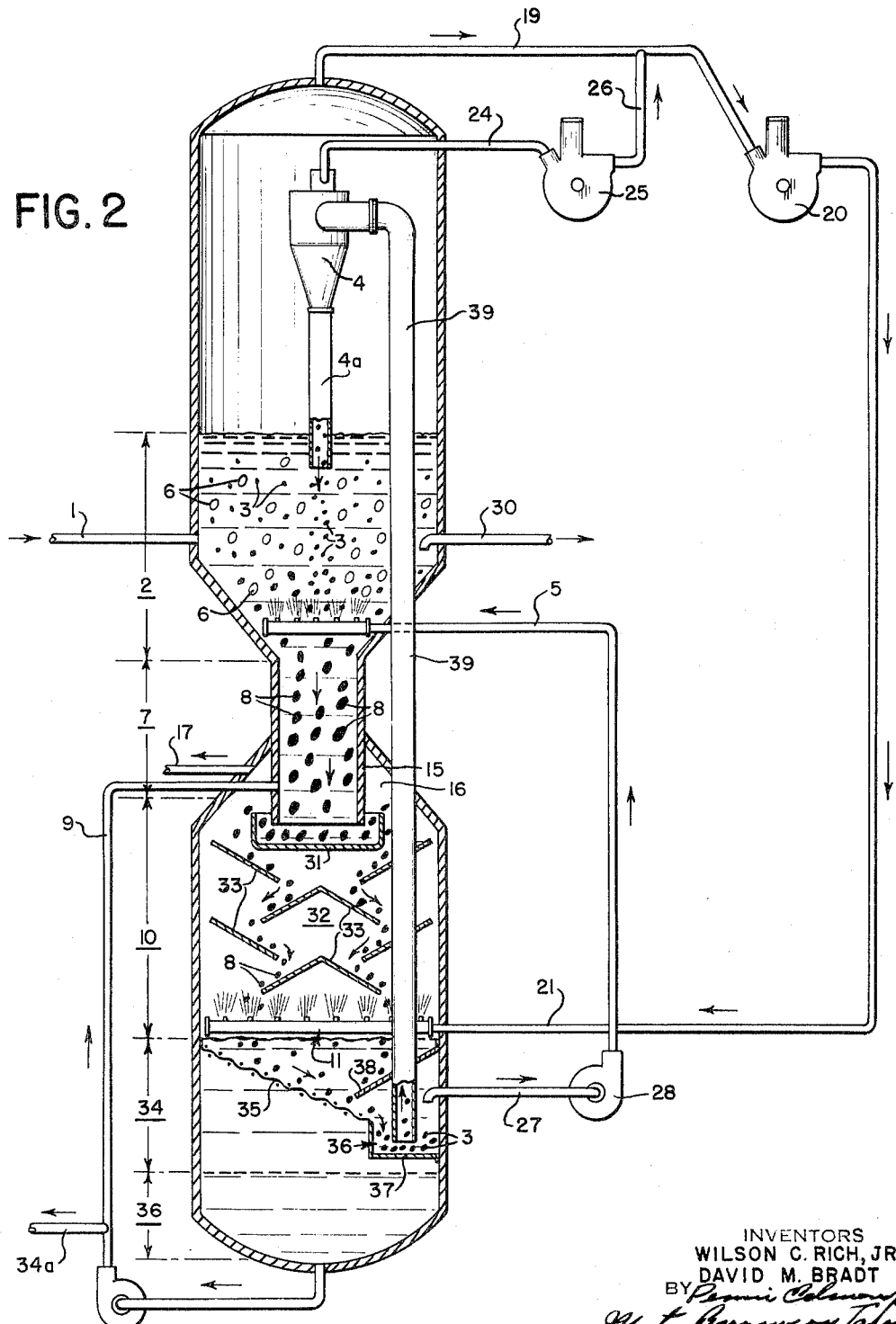
Figure 3:
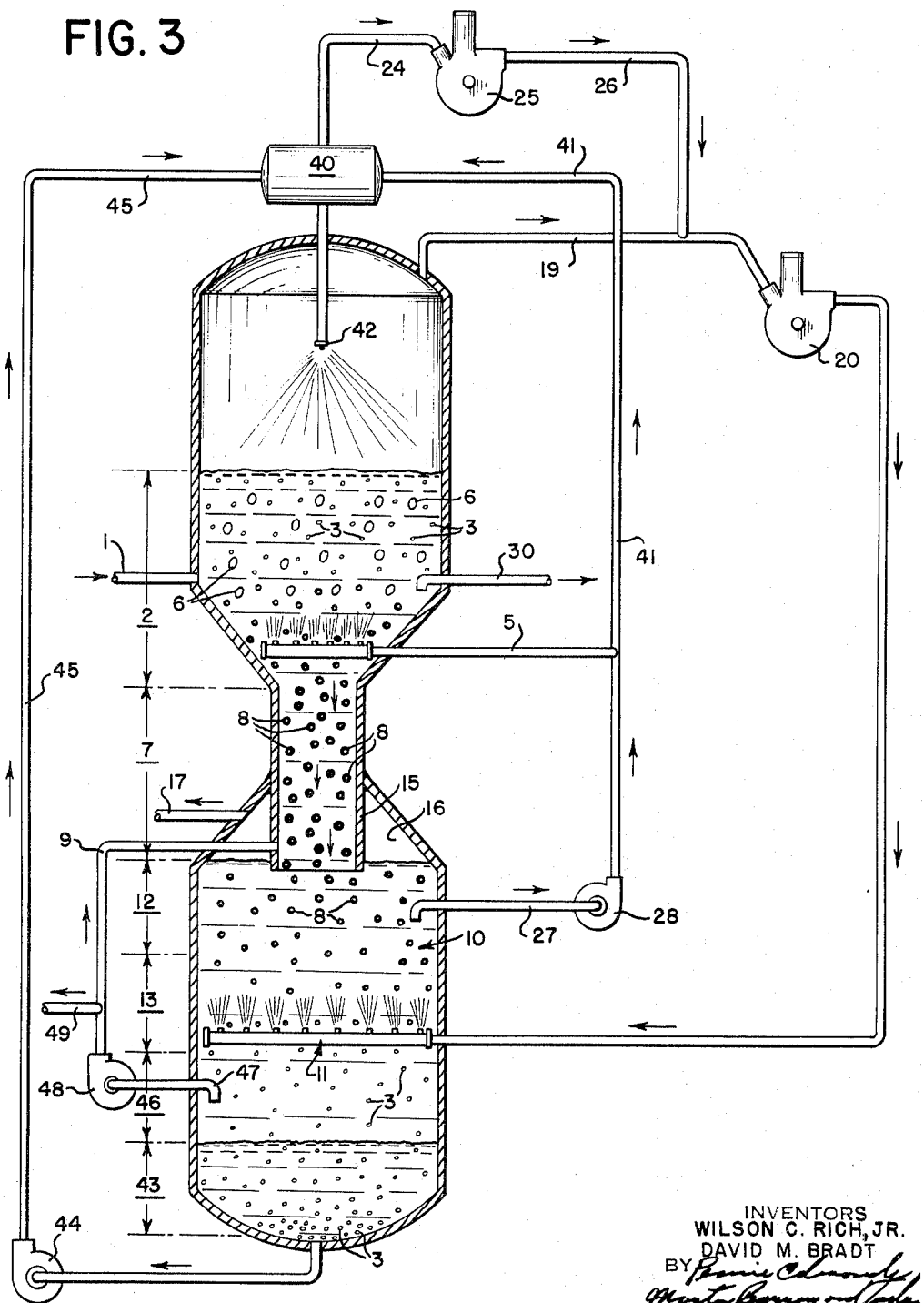

In the accompanying drawings:
FIG. 1 is a schematic view, mostly in section, showing one form of apparatus and method according to this invention;
FIG. 2 is a schematic view, mostly in section, showing a modified form and process for removing solid particles from the melting zone; and
FIG. 3 is a schematic view, mostly in section, showing a further modified form of the invention in which liquid immiscible particles are used.

The process as practiced in all three types of apparatus shown in the drawings is somewhat similar and where convenient, identical numerals will be used for the description.

In FIGS. 1 and 2, the cooled salt water or brine is fed through line 1 into a freezing zone generally indicated as 2. Solid particles or shot 3, which have been sub-cooled below the temperature at which ice forms from salt water or brine, are introduced into the freezing zone through a dip leg 4a attached to the bottom of a cyclone separator 4. A stream of immiscible refrigerant liquid is sparged into the freezing zone through line 5. The immiscible refrigerant liquid contained in the freezing zone is shown in the drawing in admixture with the salt water and solid particles as being in the form of droplets 6 for the purposes of illustration. The immiscible refrigerant boils within the freezing zone, thereby removing heat from the salt water and causing formation of ice crystals which deposit on the sub-cooled particles. The solid particles introduced into the freezing zone grow in size by virtue of the ice building up on their surfaces and sink through the freezing and into a washing zone 7. The particles having ice crystals adhered thereto are shown in the drawing as being larger than the sub-cooled particles 3 and are indicated in the drawing by numeral 8.

Fresh water is continuously introduced into the washing zone to remove residual traces of salt water from the ice covered particles 8. The fresh water can be introduced into the washing zone from any suitable source but it is advantageous to utilize the fresh water product of the process and recycle the fresh water to the washing zone through line 9 as shown in FIGS. 1, 2 and 3. The fresh water is introduced into the washing zone at such a rate that it displaces the residual salt water or brine moving into the washing zone with the particles preventing the salt water thereby present in the freezing zone from entering the melting zone.

The particles having ice adhered thereto continuously fall by gravity through the washing zone into the melting zone generally indicated as 10. Since the particles used are of a higher density than fresh or salt water, the particles can readily fall through the washing zone.

The ice adhered to the particles is melted in the melting zone by the introduction of compressed refrigerant vapors through a distributor generally indicated at 11. The melting zone divides itself into essentially three zones indicated in the drawings as 12, 13 and 14. As the warm refrigerant vapors condense in the melting zone and supply heat to melt the ice at the surface of the particles, the particles, now denuded of adhered ice, sink to the bottom of the melting zone and collect in sub-zone 14 together with the fresh water product. The intermediate sub-zone 13 consists of a mixture of refrigerant vapors, refrigerant liquid, fresh water and solid particles denuded of ice to varying degrees. The liquid refrigerant, being immiscible with the fresh water collects near the top of the washing zone in sub-zone 12.

The washing zone 7 is extended by means of extension 15 into the melting zone to provide a pocket 16. The purpose of this pocket is to collect any uncondensed vapors in the melting zone. These collected uncondensed vapors can be removed from the melting zone through line 17.

The fresh water and the particles 3 collected in sub-zone 14 are removed therefrom by means of the riser 22. Compressed refrigerant vapor is introduced at the bottom of the riser through line 23 which lowers the pressure at the bottom of the riser because of the lower average density in the riser and thereby lifts the fresh water and the particles 3 to a position above the top of the freezing section and into cyclone separator 4. The refrigerant vapor used as a lift medium is recycled compressed refrigerant vapor and operates in the same manner as the air lift principle. The denuded particles and the fresh water enter the cyclone separator 4, containing a screen, where the fresh water is removed as a part of the process through line 23a. The refrigerant vapors entering the cyclone separator are removed from the top of the separator through line 24, compressed in compressor 25 to a pressure the same as or greater than the pressure of the refrigerant vapor contained in line 19, and delivered to line 19 through line 26 for subsequent compression in compressor 20 and recycle to the melting zone and the riser.

The cyclone separator is located sufficiently above the freezing zone 2 to supply a sufficient head pressure to permit the particles 3 to drop through the cyclone leg 4a and be recycled back into the melting zone as shown in FIGS. 1 and 2.

The liquid refrigerant formed in the melting zone in sub-zone 12 is withdrawn through line 27 and pumped by means of pump 28, if desirable, and recycled to the melting zone through line 5 to supply the melting zone with refrigerant liquid.

A portion of the liquid refrigerant withdrawn from the sub-zone 12 is also fed to the bottom of the cyclone leg 4a through line 29 to supply a fluidizing medium for the solid particles 3 falling therethrough and also to sub-cool said particles to a temperature below the freezing zone temperature. This sub-cooling is accomplished by permitting the injected liquid refrigerant to evaporate in the cyclone leg. Generally, only a small portion of liquid refrigerant will be necessary in order to sufficiently reduce the temperature of the particles. The head pressure developed by the location of the cyclone separator above the freezing zone is sufficient to allow the particles to re-enter the freezing zone. The refrigerant vapors resulting from the evaporation of the liquid refrigerant in the cyclone leg are collected with the refrigerant vapors used as a lift medium entering the cyclone separator through the riser 22 and recycled through line 24, compressor 25 and line 26 and then combined with the refrigerant vapors from the head zone.

The process and apparatus as set forth in FIG. 2 is similar to that shown in FIG. 1 with the exception of the method of melting the ice from the particles and in the method of recovery and recycling the particles and the condensed refrigerant liquid formed in the melting zone.

The device shown in FIG. 2 is provided with a seal pot 31 located below the extension 15 of the washing zone 7. The particles having ice adhered thereto and the entrained wash water fall into the seal pot and overflow the seal pot into a baffled heat exchange section 32 provided in the melting zone 10. The baffled heat exchange section is provided with baffles 33. The particles flow over the baffles and are contacted with compressed refrigerant vapor provided through line 21 and distributor 11. The compressed refrigerant vapors rise through the baffled section 32 melting the ice contained on the particles as they flow over the baffles to form fresh water and the vapors are in turn condensed and fall into sub-zone 34 forming a mixed layer of liquid refrigerant and water. The lower portion of the melting zone is provided with a screen 35. The fresh water formed in the melting zone flows through the screen 35 and zone 34 to the bottom of the melting zone and collects in sub-zone 36. The particles fall against the screen having openings of such a size to prevent the particles from falling therethrough and flow downwardly into a collection zone 36a formed by the member 37. A baffle 38 is also provided above the collection zone 36a. The falling condensed fresh water contacts this baffle 38, flows off the edge and through the screen 35 preventing the fresh water from entering the collection zone 36a. The collection zone 36a thus contains only particles free of adhered ice and liquid refrigerant. A riser 39 extends into the collection zone 36a and leads to the cyclone separator 4. The pressure at the top of the cyclone 4 and in line 24 is reduced by means of compressor 25 sufficiently to cause the liquid refrigerant in the riser 39 to boil and thereby lift or draw the particles and some of the liquid refrigerant contained in the collection zone 36a upwardly through the riser 39 and into the cyclone separator 4 or any other suitable gas-solid separator. As the liquid refrigerant boils and forms vapor in the riser 39 the particles are simultaneously sub-cooled to the desired temperature suitable for re-entry into the freezing zone. The separator is located at a sufficient height above the freezing zone 2 to provide a sufficient pressure head to permit the particles to drop from the separator and re-enter the freezing zone.

FIG. 3 shows a process and apparatus for carrying out the process with liquid particles such as mercury. The liquid is stored in a tank 40 at the top of the freezing chamber. The liquid is sub-cooled to a temperature below the temperature at which ice crystals participate from the brine in the freezing zone by introducing recycled liquid refrigerant into the tank held at a pressure lower than the pressure in the freezing zone through line 41 and permitting it to boil. The now sub-cooled liquid is sprayed by means of a device such as nozzle 42 in droplet form into the freezing zone. The pre-cooled liquid particles move by gravity through the freezing chamber, the washing chamber and the melting chamber in the same manner as described with respect to FIGS. 1 and 2. The ice adhered to the liquid particles is removed by introduction of the compressed refrigerant vapor through the distributor 11 and the liquid particles now denuded of ice fall to the bottom of the chamber into sub-zone 43. The liquid coalesces in sub-zone 43 and can be recycled by means of pump 44, if desirable, to the liquid holding tank 40 through line 45. Zone 46 contains the fresh product water and is withdrawn through 47 by means of pump 48, if desirable, for product recovery through line 49 and for recycle to the washing zone through line 9.

The pressure in this system will be determined by the particular liquid refrigerant used in the process. When iso-butane is used as the liquid refrigerant, for example, the freezing zone or the salt water contained in the freezing zone will be maintained at a pressure of about 6 p.s.i.g. and the pressure at the top of the cyclone in the embodiment shown in FIGS. 1 and 2 is about 3 p.s.i.g. The temperature in the freezing zone is determined by the salt concentration in the freezing zone. At 7% salt, this temperature is about 25° F. The temperature of the melting zone in which the condensing of the recycled refrigerant vapors occur would be about 35° F. and the pressure about 10 p.s.i.g. when using iso-butane.

The vapor leaving the compressor 25 will be at about 6 p.s.i.g. so that it can combine with the vapor in line 19 which is also at about 6 p.s.i.g. The vapor leaving the compressor 20 will be at a pressure slightly above that maintained in the melting zone.

The fresh water which is drawn off through line 23, in FIG. 1, line 34a, in FIG. 2 and line 49 in FIG. 3 as the product of the process, is drawn off at a rate sufficient to maintain fairly constant conditions in the system. Salt water (brine) is withdrawn from the freezing zone through line 30 as a bleed solution to maintain a fairly constant salt concentration in the freezing zone and to prevent an undesirable build up of salt in the system. Sea water generally contains about 3.3% salt but the concentration will increase during the process. It is advantageous to withdraw sufficient salt water from the freezing zone to maintain about a 7% salt concentration.

The feed salt water is preferably cooled by heat exchange with the brine bleed and fresh water product before being fed into the freezing zone. A salt water feed temperature approaching 30 to 40° F. therein is advantageous. The pre-cooling of the feed salt water minimizes the refrigerant load in the freezing zone and thus the overall energy requirements of the process.

The liquid refrigerants which can be used according to this invention are well known to those skilled in the art. Examples of water immiscible liquid refrigerants which can be used include, but are not limited to, butane, isobutane, propane and fluorinated hydrocarbons such as di-chloro-fluoromethane, chloro-trifluoromethane, chloro-di-fluoro-methane, and so forth.

The particles or shot mixed with the salt water in the freezing zone are insoluble in water and can be liquid or solid. The particles act as nuclei for the deposition of ice crystals formed during the freezing of the fresh water contained in the brine.

Various types of particles can be used and the particular type of particle used will vary somewhat depending upon the conditions imposed upon the system. Some of the factors which would be involved in the selection of particles in practising this invention would include the material from which the particles are made, the surface characteristics of the particles, the size, shape and density of the particles, and so forth. All of these factors are inter-related and no definite limits can, therefore, be set forth. The selection of a particle having a high density, for example, might require the use of a smaller size.

The particles should be inert and non-corrosive in salt water and have a sufficient specific gravity so that they will flow or fall by gravity through the freezing zone, the washing zone or the melting zone and yet, will not flow through these zones at an adversely rapid or slow rate. The density, size and shape should be such that a significant amount of ice can be formed thereon in the freezing zone before they flow through the freezing zone.

Particles having a diameter of from about 0.1 to 10 millimeters and having a specific gravity of between about 70–850 pounds per cubic feet are within the useful range. The particles are also preferably round or spherical and smooth.

Some specific examples of particles which can be used include metal oxides such as fused alumina and mullite, ceramics such as glass, silica and quartz. Plastic or resin particles as well as metal particles such as brass can also be used. An example of a liquid particle would be mercury.

Various specific examples of the method have been shown and described together with certain possible embodiments of apparatus which can be used for carrying the method into effect. These examples and embodiments have been given by way of illustration only and modifications and changes of the processes and apparatus described herein may be made without departing from the invention. For example, under certain conditions and with certain refrigerants hydrates of the refrigerants may form instead of ice and the process will work equally as well.

We claim:

1. The process of preparing fresh water from salt water in a system having freezing, washing and melting zones in a vertical alignment sufficient to allow water-insoluble particles to flow by gravity through said zones which comprises introducing salt water into a freezing zone, introducing into said freezing zone water insoluble particles having a vapor pressure substantially below that of salt water and which are cooled below the freezing point at which ice crystallizes from salt water, introducing into said freezing zone an immiscible liquid refrigerant to remove heat from the freezing zone and cause deposition of ice from the salt water on said particles, said particles having a density greater than water to permit the particles when coated with ice to settle in water, allowing said particles to continuously settle by gravity through the salt water in said freezing zone through a washing zone which is of higher pressure than said freezing zone and in which fresh water is added to displace salt water adhering to said particles, melting the ice coating from said particles and recovering the fresh water.

2. The process of preparing fresh water from salt water which comprises introducing into a mixture of salt water and water insoluble particles having a vapor pressure substantially below that of salt water and which are cooled below the freezing point at which ice crystallizes from salt water an immiscible liquid refrigerant, boiling the liquid refrigerant in the mixture of salt water and water insoluble particles to form a water-refrigerant hydrate on the surface of the water insoluble particles, said particles having a density greater than water to permit settling by gravity of the particles when coated with ice, allowing the water insoluble particles having the hydrate coated thereon to descend continuously by gravity from the salt water into a washing zone, continuously introducing fresh water into said washing zone to displace said salt water adhering to the hydrate on the particles and at such a rate to prevent the salt water from passing through said washing zone, collecting the particles having the hydrate thereon after they have passed through the washing zone, removing the hydrate through said particles and recovering the fresh water.

3. The process of preparing fresh water from salt water in a system having freezing, washing and melting zones in a vertical alignment sufficient to allow water-insoluble particles to flow by gravity through said zones which comprises continuously introducing salt water into a freezing zone, continuously dispersing into salt water contained in the freezing zone, water-insoluble particles having a vapor pressure substantially below that of salt water and which have been cooled to a temperature below the temperature at which ice crystallizes from the salt water, continuously introducing into said freezing zone immiscible liquid refrigerant to remove heat from the freezing zone and cause deposition of ice crystals from the salt solution on the particles, allowing the particles to continuously descend by gravity from said freezing zone through a washing zone, continuously introducing fresh wash water in the washing zone to displace salt water adhering to the particles at such a rate to prevent the salt water from passing through said washing zone, allowing the particles to which the ice crystals are adhered to further and continuously descend by gravity into a melting zone, continuously introducing compressed refrigerant vapors into the melting zone to melt the ice adhered to the surface of the particles and to produce fresh water in said melting zone, and separating the fresh water from the immiscible refrigerant.

4. A process of preparing fresh water from salt water in a system having freezing, washing and melting zones in a vertical alignment sufficient to allow water-insoluble particles to flow by gravity through said zones which comprises providing a freezing zone, a washing zone and a melting zone containing fresh water, an immiscible liquid refrigerant and water-insoluble solid particles having a density greater than water, continuously introducing salt water into said freezing zone, continuously recycling said particles from said melting zone into said freezing zone at a temperature below the temperature at which ice crystallizes from the salt water to form a particle-salt water mixture, continuously recycling into said freezing zone compressed liquid refrigerant from said melting zone to remove heat from the freezing zone and cause deposition of ice crystals from the salt solution on the solid particles, allowing said particles on which the ice crystals have been deposited to descend continuously by gravity through said freezing zone into a washing zone continuously introducing fresh water into said washing zone, to displace salt water adhering to the particles and at such a rate to prevent the salt water from passing through said washing zone, allowing the particles to further continuously descend by gravity through said washing zone into said melting zone, collecting the refrigerant vapor resulting from the freezing of the fresh water contained in the salt water in said freezing zone and continuously recycling compressed refrigerant vapor to the melting zone to melt the ice deposited on the particles to produce fresh water in said melting zone and solid particles free of deposited ice crystals, separating the fresh water from the immiscible refrigerant and withdrawing a portion of the salt water as a bleed solution from the freezing zone in sufficient amount to maintain a fairly constant salt concentration in said freezing zone to prevent salt accumulation therein.

References Cited by the Examiner

UNITED STATES PATENTS

| 2,579,421 | 12/1951 | Egan | 62—58 |
| 2,666,304 | 1/1954 | Ahrel | 62—58 |
| 2,751,762 | 6/1956 | Colton. | |
| 2,764,488 | 9/1956 | Slattery. | |
| 2,886,603 | 5/1959 | Shelton. | |
| 2,896,419 | 7/1959 | Thompson | 62—58 |
| 3,027,320 | 3/1962 | Buchanan | 62—58 X |
| 3,098,735 | 7/1963 | Clark | 62—58 |
| 3,119,772 | 1/1964 | Hess | 62—58 X |
| 3,170,778 | 2/1965 | Roth | 62—58 |

FOREIGN PATENTS 217,766   10/1958   Australia.

NORMAN YUDKOFF, *Primary Examiner.*

RICHARD A. O'LEARY, *Examiner.*

D. R. MATTHEWS, *Assistant Examiner.*